United States Patent
Yoon

(10) Patent No.: US 9,259,706 B2
(45) Date of Patent: Feb. 16, 2016

(54) COMPOSITE STRUCTURE FOR AN ARTIFICIAL PHOTOSYNTHESIS REACTION AND INTEGRATED REACTION DEVICE FOR ARTIFICIAL PHOTOSYNTHESIS INCLUDING SAME, AND COMPOSITE STRUCTURE FOR A WATER SPLITTING REACTION AND INTEGRATED REACTION DEVICE FOR WATER SPLITTING INCLUDING SAME

(71) Applicant: Sogang University Research Foundation, Seoul (KR)

(72) Inventor: Kyung Byung Yoon, Seoul (KR)

(73) Assignee: Sogang University Research Foundation, Seoul (KR)

(*) Notice: Subject to any disclaimer, the term of this patent is extended or adjusted under 35 U.S.C. 154(b) by 283 days.

(21) Appl. No.: 14/066,322

(22) Filed: Oct. 29, 2013

(65) Prior Publication Data

US 2014/0120000 A1 May 1, 2014

Related U.S. Application Data

(63) Continuation of application No. PCT/KR2012/003365, filed on Apr. 30, 2012.

(30) Foreign Application Priority Data

Apr. 29, 2011 (KR) .................. 10-2011-0040947

(51) Int. Cl.
*B01J 19/12* (2006.01)
*B01J 19/24* (2006.01)
*C01B 3/04* (2006.01)
*C01B 3/50* (2006.01)

(52) U.S. Cl.
CPC ............ *B01J 19/127* (2013.01); *B01J 19/2475* (2013.01); *C01B 3/042* (2013.01); *C01B 3/501* (2013.01); *B01J 2219/0877* (2013.01); *Y02E 60/364* (2013.01)

(58) Field of Classification Search
CPC .................. B01J 19/127; B01J 19/2475; B01J 2219/0877; C01B 3/042; C01B 3/501; Y02E 60/3674
See application file for complete search history.

(56) References Cited

U.S. PATENT DOCUMENTS

| 4,921,585 A | 5/1990 | Molter |
| 2008/0283411 A1 | 11/2008 | Eastman et al. |

FOREIGN PATENT DOCUMENTS

| JP | 2003-275599 | 9/2003 |
| JP | 2004-059507 | 2/2004 |
| WO | WO 2007/145586 | 12/2007 |

OTHER PUBLICATIONS

International Search Report issued in International App. No. PCT/KR2012/003365, mailed Nov. 28, 2012.

*Primary Examiner* — Kishor Mayekar
(74) *Attorney, Agent, or Firm* — Greer Burns & Crain Ltd.

(57) ABSTRACT

The present disclosure relates to a novel composite structure for artificial photosynthesis reaction and an integrated reaction device for artificial photosynthesis including the same, and a novel composite structure for water splitting reaction and an integrated reaction device for water splitting including the same.

20 Claims, 12 Drawing Sheets

Composite structure for artificial photosynthesis reaction

Composite structure for artificial photosynthesis reaction

Composite structure for artificial photosynthesis reaction

Composite structure for artificial photosynthesis reaction

Composite structure for water splitting reaction

Composite structure for water splitting reaction

Composite structure for water splitting reaction

COMPOSITE STRUCTURE FOR AN ARTIFICIAL PHOTOSYNTHESIS REACTION AND INTEGRATED REACTION DEVICE FOR ARTIFICIAL PHOTOSYNTHESIS INCLUDING SAME, AND COMPOSITE STRUCTURE FOR A WATER SPLITTING REACTION AND INTEGRATED REACTION DEVICE FOR WATER SPLITTING INCLUDING SAME

CROSS-REFERENCE TO RELATED APPLICATION

This application is a continuation of International Patent Application No. PCT/KR2012/003365 filed on Apr. 30, 2012, claiming priority based on Korean Patent Application No. 10-2011-0040947 filed on Apr. 29, 2011, the contents of all of which are incorporated herein by reference in their entirety.

FIELD OF THE INVENTION

The present disclosure relates to a novel composite structure for artificial photosynthesis reaction and an integrated reaction device for artificial photosynthesis including the same, and a novel composite structure for water splitting reaction and an integrated reaction device for water splitting including the same.

BACKGROUND OF THE INVENTION

Photosynthesis is a reaction for converting carbon dioxide and water into oxygen and starch by using solar light as energy. Such photosynthesis actively occurs in green plants and photosynthesis bacteria. Contrary to the photosynthesis in the realm of nature, artificial photosynthesis is a reaction for converting carbon dioxide and water into oxygen, liquid fuel, etc., by using solar light as energy.

In the chemical aspect, carbon dioxide ($CO_2$) and water ($H_2O$) are materials having very low potential energy, while fuel and oxygen are materials having relatively high potential energy. Plants in the realm of nature convert carbon dioxide and water into carbohydrate and oxygen ($O_2$) which are materials having relatively high potential energy by using solar energy through photosynthesis. Once the converted carbohydrate and oxygen are reacted once again, they are converted back into carbon dioxide and water. Heat equal to the difference in potential energy between the two reaction materials is discharged outward.

Meanwhile, human beings have obtained energy through combustion of fossil fuel, that is, a reaction for reacting fossil fuel with oxygen to produce carbon dioxide and water. As a result, a concentration of carbon dioxide in the air is increasing every day. This has become a primary cause for global warming. The global warming is being faster and has been regarded as one of the critical factors of the global environmental problems.

Accordingly, there have been worldwide efforts to raise applicability of renewable energy such as solar energy, water power, wind power, tidal energy, geothermal heat, bio fuel, etc., instead of the fossil fuel. Among the energy, solar energy is the most promising renewable energy.

As a conventionally developed method for utilizing solar energy, there is a method for converting solar heat and solar light into electric energy. However, of the electric power produced throughout the world, the electric power produced by using solar energy is too small in an amount to be ignored. Moreover, a solar cell has already reached the limit of its efficiency, and the unit price of production of solar cells is increasing. Accordingly, the necessity to realize artificial photosynthesis for producing useful materials by using solar light, water and carbon dioxide is increasing.

However, the artificial photosynthesis has not been realized even at the level of a laboratory despite the fact that many scientists have put forth their efforts for the last century. Accordingly, success in the research of artificial photosynthesis is expected to greatly contribute to improvement of global environment and development of scientific technologies.

BRIEF SUMMARY OF THE INVENTION

The present disclosure provides a novel composite structure for artificial photosynthesis reaction and an integrated reaction device for artificial photosynthesis including the same, and a novel composite structure for water splitting reaction and an integrated reaction device for water splitting including the same.

However, the purposes sought to be achieved by the present disclosure are not limited to those described above. Other purposes, which are sought to be achieved by the present disclosure but are not described herein, can be clearly understood by one of ordinary skill in the art from the descriptions below.

Means for Solving the Problems

In order to achieve the objective, in accordance with a first aspect of the present disclosure, there is provided a composite structure for artificial photosynthesis reaction, including: Structure 1 for oxidation reaction of water under light-irradiation; Structure 2 jointed with Structure 1 to transfer an electron produced by the oxidation reaction of water in Structure 1; Structure 3 for reduction reaction of carbon dioxide being joined with Structure 2; and a membrane for proton transfer, wherein Structures 1 to 3 are placed in the inside of the membrane for proton transfer; and at least part of Structure 1 and at least part of Structure 3 are exposed to the outside of the membrane for proton transfer; and each of an electron and a proton formed by the oxidation reaction of water in Structure 1 are transferred to Structure 3 through Structure 2 and the membrane for proton transfer to be reacted with carbon dioxide supplied to Structure 3 and produce a fuel material including hydrocarbon.

In order to achieve the objective, in accordance with a second aspect of the present disclosure, there is provided an integrated reaction device for artificial photosynthesis, including the composite structure for artificial photosynthesis reaction according to first aspect of the present disclosure. In the integrated reaction device for artificial photosynthesis, a multiple number of the composite structures for artificial photosynthesis reaction may be arranged in the form of an array. The integrated reaction device for artificial photosynthesis may include:

a reaction chamber, which includes at least one light transmitting transparent part, and in which at least one photooxidation reaction part of water and at least one reduction reaction part of carbon dioxide are placed in order and in an alternative manner;

at least one array of the composite structure for artificial photosynthesis reaction being placed between the photooxidation reaction part of water and the reduction reaction part of carbon dioxide, which are placed in an alternative manner;

a supply part of water formed in one side of each of the at least one photooxidation reaction part of water and a discharge part of oxygen formed in the other side thereof;

a supply part of carbon dioxide formed in one side of each of the at least one reduction reaction part of carbon dioxide, and a discharge part of product formed in the other side thereof; and wherein Structure 1 and Structure 3 included in the array are placed to contact with the photooxidation reaction part of water and the reduction reaction part of carbon dioxide, respectively.

In order to achieve the objective, in accordance with a third aspect of the present disclosure, there is provided a composite structure for artificial photosynthesis reaction, including: a membrane for proton transfer; Structure 1' for oxidation reaction of water under light-irradiation; Structure 2' for electron transfer; and Structure 3' for reduction reaction of carbon dioxide; wherein Structure 2' is formed within the membrane for proton transfer such that both ends of Structure 2' are exposed to the outside of the membrane for proton transfer, Structures 1' and 3' are formed on both sides of Structure 2', respectively; and an electron and a proton produced by the oxidation reaction of water under light-irradiation in Structure 1' are transferred to Structure 3' through Structure 2' and the membrane for proton transfer to be reacted with carbon dioxide supplied to Structure 3' and produce a fuel material including hydrocarbon.

In order to achieve the objective, in accordance with a fourth aspect of the present disclosure, there is provided an integrated reaction device for artificial photosynthesis, including the composite structure according to third aspect of the present disclosure. In the integrated reaction device for artificial photosynthesis, a multiple number of the composite structures for artificial photosynthesis reaction may be arranged in the form of an array. The integrated reaction device for artificial photosynthesis may include:

a reaction chamber, which includes at least one light transmitting transparent part, and in which at least one photooxidation reaction part of water and at least one reduction reaction part of carbon dioxide are placed in order and in an alternative manner;

at least one array of the composite structure for artificial photosynthesis reaction being placed between the photooxidation reaction part of water and the reduction reaction part of carbon dioxide, which are arranged in an alternative manner;

a supply part of water formed in one side of each of the at least one photooxidation reaction part of water and a discharge part of oxygen formed in the other side thereof;

a supply part of carbon dioxide formed in one side of each of the at least one reduction reaction part of carbon dioxide, and a discharge part of product formed in the other side thereof, and wherein Structure 1' and Structure 3' included in the array are placed to contact with the photooxidation reaction part of water and the reduction reaction part of carbon dioxide, respectively.

In order to achieve the objective, in accordance with a fifth aspect of the present disclosure, there is provided a composite structure for water splitting reaction, including: a membrane for proton transfer; Structure 1" for oxidation reaction of water under light-irradiation; Structure 2" for electron transfer; and Structure 3" for reduction reaction of proton; wherein Structure 2" is formed within the membrane for proton transfer such that both ends of Structure 2" are exposed to the outside of the membrane for proton transfer, Structures 1" and 3" are formed in both sides of Structure, respectively; and an electron and a proton produced by the oxidation reaction of water under light-irradiation in Structure 1" are transferred to Structure 3" through Structure 2" and the membrane for proton transfer to be reduced in Structure 3" and produce hydrogen.

In order to achieve the objective, in accordance with a sixth aspect of the present disclosure, there is provided an integrated reaction device for water splitting reaction, including the composite structure according to fifth aspect of the present disclosure. In the integrated reaction device for water splitting reaction, a multiple number of the composite structures for water splitting reaction may be arranged in the form of an array. The integrated reaction device for water splitting reaction may include:

a reaction chamber, which includes at least one light transmitting transparent part and at least one photooxidation reaction part of water, and in which an array of the composite structure for water splitting reaction is placed between the photooxidation reaction parts of water; and a supply part of water formed in one side of each of the photooxidation reaction part of water and a discharge part of hydrogen formed in the other side thereof; and wherein an electron and a proton produced by the oxidation reaction of water in Structure 1" through light-irradiation to one side of the photooxidation reaction part of water are transferred to Structure 3" through Structure 2" and the membrane for proton transfer, respectively, to be reduced and produce hydrogen.

Effect of the Invention

According to the present disclosure, it is possible to prepare liquid fuel such as hydrogen, hydrocarbon and alcohols, etc. by using water and carbon dioxide as fuel and solar light as energy. Especially, by using materials utilizing low-cost and common elements, it is possible to provide a composite structure for artificial photosynthesis reaction and an integrated reaction device for artificial photosynthesis including the same, and a composite structure for water splitting reaction and an integrated reaction device for water splitting including the same. By using the structures and devices, it is possible to realize artificial photosynthesis so as to contribute to diversification of application and commercialization of an artificial photosynthesis method. In addition, the composite structure for artificial photosynthesis reaction and the integrated reaction device for artificial photosynthesis including the same, and the composite structure for water splitting reaction and the integrated reaction device for water splitting including the same according to the present disclosure do not require application of an external voltage in each of the artificial photosynthesis reaction and the water splitting reaction, and thus, can improve energy efficiency of the artificial photosynthesis reaction and the water splitting reaction.

DETAILED DESCRIPTION OF THE INVENTION

Hereinafter, illustrative embodiments and examples of the present disclosure will be described in detail with reference to the accompanying drawings so that inventive concept may be readily implemented by those skilled in the art.

However, it is to be noted that the present disclosure is not limited to the illustrative embodiments and examples but can be realized in various other ways.

Throughout the whole document, the term "comprises or includes" and/or "comprising or including" used in the document means that one or more other components, steps, operations, and/or the existence or addition of elements are not excluded in addition to the described components, steps, operations and/or elements. The terms "about or approximately" or "substantially" used in the document are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Throughout the whole document, the terms "A and/or B" mean "A or B, or A and B."

Hereinafter, a novel composite structure for artificial photosynthesis reaction and an integrated reaction device for artificial photosynthesis including the same, and a novel composite structure for water splitting reaction and an integrated reaction device for water splitting including the same according to the present disclosure will be described in detail with reference to illustrative embodiments, examples and drawings. However, the present disclosure may not be limited to the illustrative embodiments, examples and drawings.

A first aspect of the present disclosure can provide a composite structure for artificial photosynthesis reaction, including:

Structure 1 for oxidation reaction of water under light-irradiation;

Structure 2 jointed with Structure 1 to transfer an electron produced by the oxidation reaction of water in Structure 1;

Structure 3 for reduction reaction of carbon dioxide being joined with Structure 2; and a membrane for proton transfer, wherein Structures 1 to 3 are placed in the inside of the membrane for proton transfer, and at least part of Structure 1 and at least part of Structure 3 are exposed to the outside of the membrane for proton transfer, and each of an electron and a proton formed by the oxidation reaction of water in Structure 1 are transferred to Structure 3 through Structure 2 and the membrane for proton transfer to be reacted with carbon dioxide supplied to Structure 3 and produce a fuel material including hydrocarbon.

Figure 1:
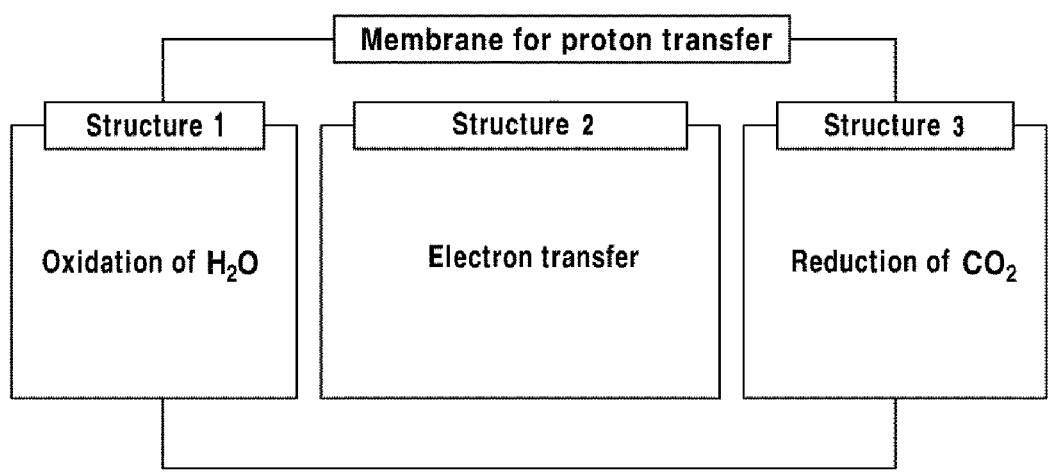
FIG. 1 is a schematic diagram of a composite structure for artificial photosynthesis reaction in accordance with an illustrative embodiment of the present disclosure.

In the composite structure for artificial photosynthesis reaction (refer to FIG. 1), it is unnecessary to apply an external voltage during the process, in which an electron and a proton formed by the oxidation reaction of water in Structure 1 are transferred to Structure 3 through Structure 2 and the membrane for proton transfer to be reacted with carbon dioxide supplied to Structure 3 and produce a fuel material including hydrocarbon. Accordingly, if the composite structure for artificial photosynthesis reaction is applied to artificial photosynthesis reaction, energy conversion efficiency can be improved.

In an illustrative embodiment, each of Structures 1 to 3 may have from a nanometer size to a micrometer size, but may not be limited thereto.

In an illustrative embodiment, Structure 1 may be formed including a photoactive material, but may not be limited thereto. For example, the photoactive material may have activity with respect to visible light, ultraviolet light and/or infrared light, but may not be limited thereto.

In an illustrative embodiment, Structure 3 may be formed including a photoactive material, but may not be limited thereto. For example, the photoactive material may have activity with respect to visible light, ultraviolet light and/or infrared light, but may not be limited thereto.

Figure 2A:
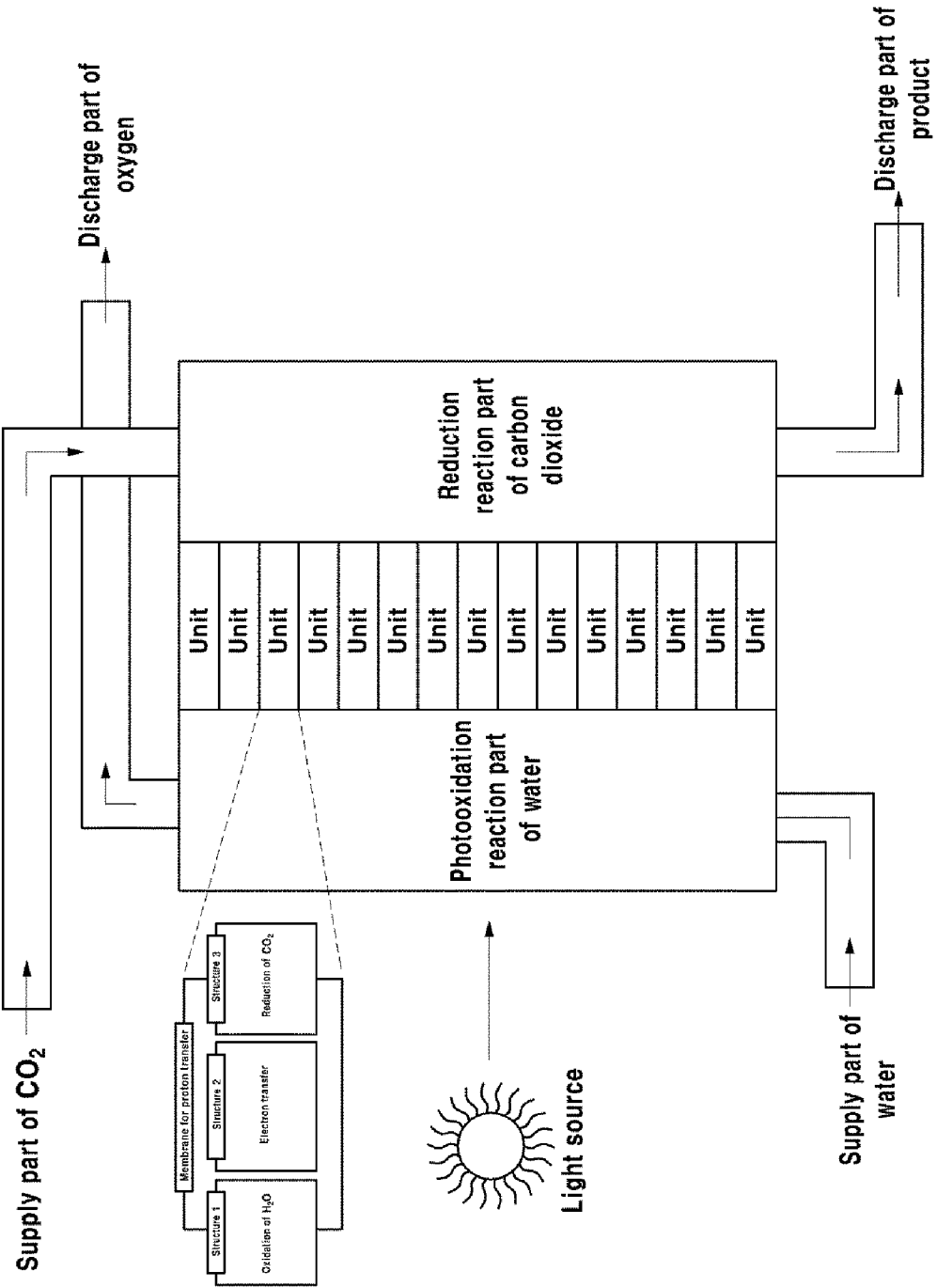
FIGS. 2a to 2c are schematic diagrams of an integrated reaction device for artificial photosynthesis in accordance with an illustrative embodiment of the present disclosure.
Figure 2B:
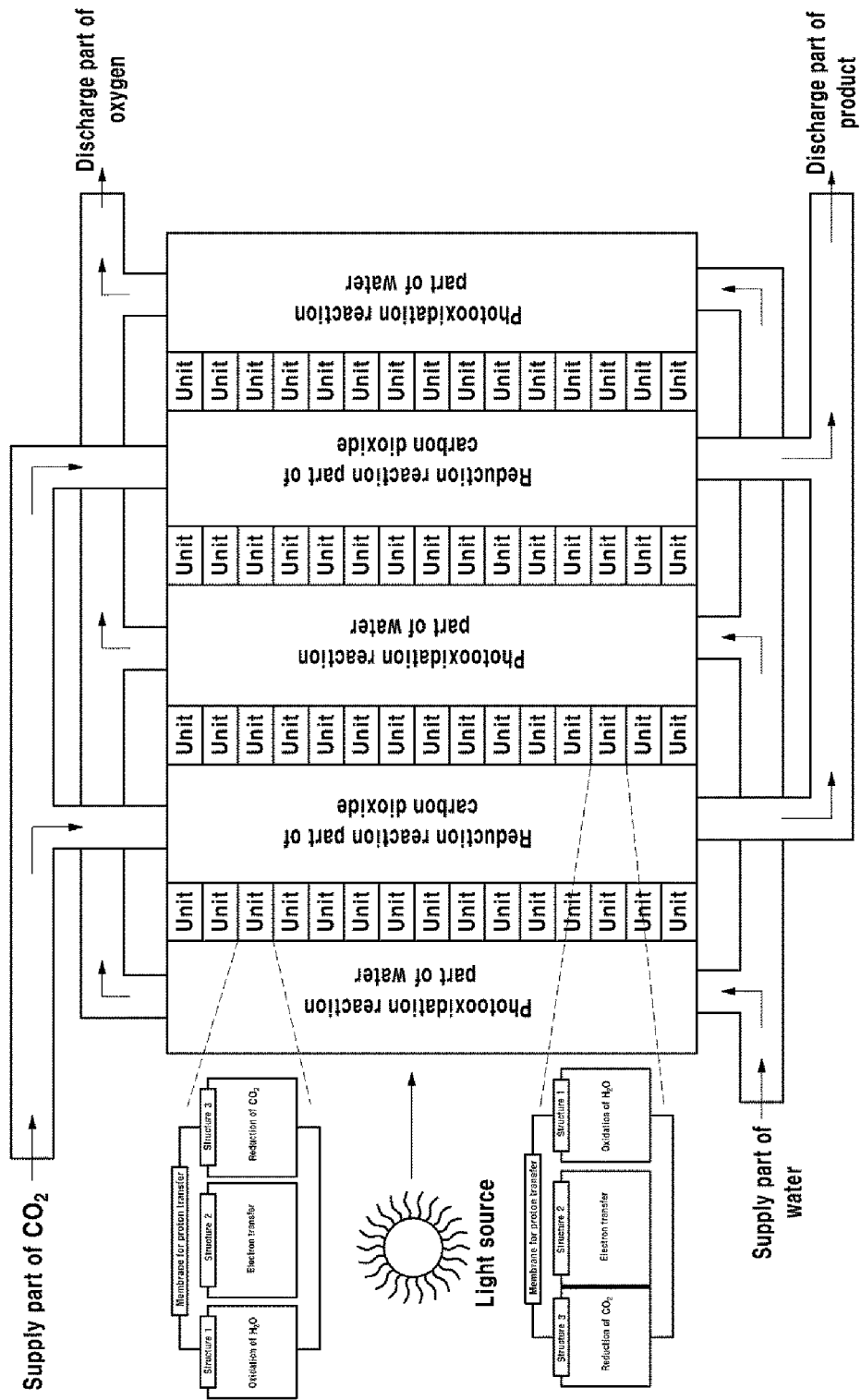

In an illustrative embodiment, Structures 1 to 3 form a unit composite arranged in line, and the composite structure for artificial photosynthesis reaction may include at least one unit composite (refer to FIGS. 2a and 2b). However, the present disclosure may not be limited thereto.

In an illustrative embodiment, each of a material for forming Structure 1 for oxidation reaction of water under light-irradiation, a material for forming Structure 2 for transfer of a produced electron, and a material for forming Structure 3 for reduction reaction of carbon dioxide may be selected from materials having different energy levels. In addition, an energy level of a valence band of a photoactive material for forming Structure 1 may be lower than an oxidation/reduction potential of water, and an energy level of a conduction band of a photoactive material for forming Structure 1 may be higher than an oxidation/reduction potential of water. However, the present disclosure may not be limited thereto.

In an illustrative embodiment, the material for forming Structure 2 may include a material having an energy level, at which when an electron of a valence band of the photoactive material for forming Structure 1 is excited by light and photo-transited into a conduction band, the photo-transited electron can be accepted. The material for forming Structure 3 may include a material having an energy level, at which the electron transited and transferred to Structure 2 can be accepted. However, the present disclosure may not be limited thereto. For example, an energy level of a conduction band of the material for forming Structure 2 may be lower than an energy level of a conduction band of the material for forming Structure 1, and an energy level of a conduction band of the material for forming Structure 3 may be lower than an energy level of a conduction band of the material for forming Structure 2. However, the present disclosure may not be limited thereto. However, the energy level of the conduction band of the material for forming Structure 2 and the energy level of the conduction band of the material for forming Structure 3 should be higher than an oxidation/reduction potential of water.

In another illustrative embodiment, Structure 3 may include a photoactive material. An energy level of a valence band (or HOMO) of the photoactive material may be lower than the energy level of the conduction band of the material for forming Structure 2, and an energy level of a conduction band (or LUMO) of the photoactive material may be higher than the energy level of the conduction band of the material for forming Structure 2. In this case, once an electron of the valence band of the photoactive material for forming Structure 3 is excited by light-irradiation and transited to a conduction band, a hole is formed in the valence band. The electron transferred through Structure 2 is transited to the hole formed in Structure 3. The electron photo-transited to the conduction band of Structure is reacted with a reaction material including supplied carbon dioxide and/or proton so as to produce fuel materials such as hydrogen, hydrocarbon and alcohols, etc. However, the present disclosure may not be limited thereto.

The descriptions of the relation and properties of the energy levels of Structures 1 to 3 may be applied to Structures 1' to 3' and Structures 1" to 3", which are described later.

In an illustrative embodiment, Structure 1 may include a first support particle and a photocatalyst particle for oxidation reaction of water being formed on a surface of the first support particle, but may not be limited thereto. As the photocatalyst for oxidation reaction of water, a catalyst material known in the art of the present disclosure and having oxidation activity of water under light-irradiation may be used without limitation. For example, among the catalyst material known as the photocatalyst for oxidation reaction of water in the art of the present disclosure and having oxidation activity of water under light-irradiation, a catalyst material having oxidation activity of water under irradiation of light including visible light, ultraviolet light, infrared light or combinations thereof may be used. However, the present disclosure may not be limited thereto. In an illustrative embodiment, the photocatalyst for oxidation reaction of water may include a photoactive material, but may not be limited thereto. For example, the photoactive material may include a semiconductor. The semiconductor needs to meet the requirements that an electron of a conduction band of the semiconductor be transferred to Structure 2, a hole of a valence band of the semiconductor have a potential capable of oxidizing water and generating oxygen, and stability in a reaction be assured. For example, the photoactive material may include a p-type semiconductor, a semiconductor. As unlimited examples for the p-type semiconductor, there are $TiO_2$, $ZnO$, $SrTiO_3$, $Ta_2O_5$, $ZrO_2$, $WO_3$, $BiVO_4$, $Pb_4Ti_3$, $CdIn_2O_4$, $Fe_2TiO_5$, $CrNbO_4$, $Cr_2Ti_2O_7$, $CdS$, $MoS_2$, $CdTe$, $CdZnTe$, $ZnTe$, $HgTe$, $HgZnTe$, $HgSe$ and combinations thereof. In addition, $TiO_2$ may be doped with Y, V, Mo, Cr, Cu, Al, Ta, B, Ru, Mn, Fe, Li, Nb, In, Pb, Ge, C, N, S, Sb or combinations thereof, but may not be limited thereto. In an illustrative embodiment, the photocatalyst for oxidation reaction of water may further include a photosensitive material, in addition to the photoactive material, but may not be limited thereto. As unlimited examples for the photosensitive material, there are an organic dye, a metal complex compound dye, a quantum dot, etc., which are known in the art of the present disclosure. However, the present disclosure may not be limited thereto.

In an illustrative embodiment, Structure 3 may include a second support particle and a catalyst particle for reduction reaction of carbon dioxide being formed on a surface of the second support particle, but may not be limited thereto. As the catalyst for reduction reaction of carbon dioxide, a catalyst material known in the art of the present disclosure and having reduction activity of carbon dioxide may be limited without limitation. In an illustrative embodiment, as the catalyst for reduction reaction of carbon dioxide, a catalyst material having reduction activity of carbon dioxide under light-irradiation may be used, but may not be limited thereto. For example, the light may include visible light, ultraviolet light, infrared light or combinations thereof, but may not be limited thereto.

In an illustrative embodiment, the membrane for proton transfer may be prepared by using a porous thin film having a hole, and Structure 1, Structure 2, and Structure 3 in the form of particle may be joined in order with the hole of the porous thin film and arranged therein (refer to FIG. 10b). However, the present disclosure may not be limited thereto.

In an illustrative embodiment, each of Structures 1 to 3 may be in the form of a nano-rod, but may not be limited thereto.

In an illustrative embodiment, as the membrane for proton transfer, a material known in the art of the present disclosure and having an ability to transfer a proton may be used without limitation. In an illustrative embodiment, the membrane for proton transfer may include a polymer for proton transfer, a glass or non-crystalline material for proton transfer or a crystalline material for proton transfer, but may not be limited thereto. In another illustrative embodiment, the membrane for proton transfer may include an organic polymer, an inorganic polymer or an organic-inorganic hybrid polymer, which has an ability to transfer a proton, but may not be limited thereto. For example, the membrane for proton transfer may include an organic polymer, an inorganic polymer or an organic-inorganic hybrid polymer, which has a hydrogen ion-exchangeable group, but may not be limited thereto.

In an illustrative embodiment, the membrane for proton transfer may include a fluorine-containing polymer for proton transfer, a composite of a fluorine-containing polymer/LDH for proton transfer or phosphosilicate, but may not be limited thereto. For example, the membrane for proton transfer may include a nafion, a nafion/LDH composite, or a phosphosilicate, but may not be limited thereto.

In an illustrative embodiment, Structure 2 may include a conductive organic material, a conductive inorganic material, an organic semiconductor, an inorganic semiconductor or combinations thereof, for electron transfer, but may not be limited thereto. For example, Structure 2 may include a member selected from the group consisting of a metal, a semiconductor or a combination thereof; a conductive organic material, an organic semiconductor or a combination thereof; and combinations thereof, i.e., a conductive material including platinum, gold, palladium, nickel, silver, titanium, copper, graphene, CNT, graphite or combinations thereof; a semiconductor including n-type silicone, p-type silicone, a compound semiconductor, an oxide semiconductor or combinations thereof; a conductive polymer including a conductive organic polymer, a conductive inorganic polymer or a combination thereof; or combinations thereof, but may not be limited thereto. As for the material for electron transfer, any material, which has sufficiently high conduction band energy, and thus, can transfer an electron to Structure 3, may be used without limitation. For example, the material for electron transfer may include $TiO_2$, ZnO or a combination thereof, but may not be limited thereto. In addition, the material for electron transfer uses a material in the form of a single crystal including $TiO_2$, ZnO or a combination thereof so that an electron can be easily transferred through LUMO of the material.

A second aspect of the present disclosure can provide an integrated reaction device for artificial photosynthesis, including the composite structure for artificial photosynthesis reaction according to the first aspect of the present disclosure. In the integrated reaction device for artificial photosynthesis, a multiple number of the composite structures for artificial photosynthesis reaction may be arranged in the form of an array.

In an illustrative embodiment, the integrated reaction device for artificial photosynthesis may include:

a reaction chamber, which includes at least one light transmitting transparent part, and in which at least one photooxidation reaction part of water and at least one reduction reaction part of carbon dioxide are arranged in order and in an alternative manner;

at least one array of the composite structure for artificial photosynthesis reaction being placed between the photooxidation reaction part of water and the reduction reaction part of carbon dioxide, which are placed in an alternative manner;

a supply part of water formed in one side of each of the at least one photooxidation reaction part of water, and a discharge part of oxygen formed in the other side thereof;

a supply part of carbon dioxide formed in one side of each of the at least one reduction reaction part of carbon dioxide, and a discharge part of product formed in the other side thereof; and wherein Structure 1 and Structure 3 included in the array are placed to contact with the photooxidation reaction part of water and the reduction reaction part of carbon dioxide, respectively.

Figure 2C:
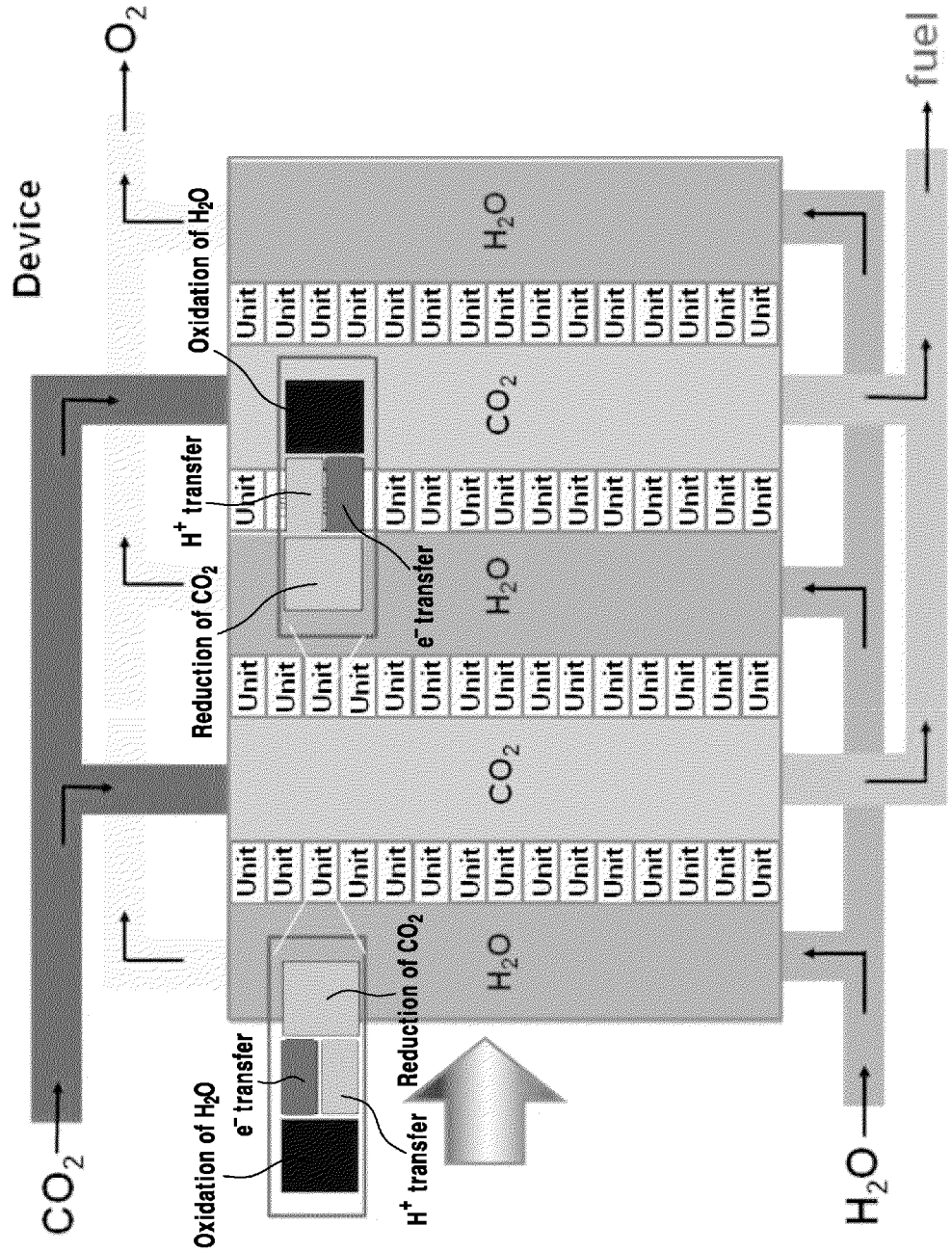

In an illustrative embodiment, in the integrated reaction device for artificial photosynthesis (refer to FIGS. 2a to 2c), an electron and a proton produced by the oxidation reaction of water in Structure 1 through light-irradiation to the photooxidation reaction part of water are transferred to Structure 3 for reduction reaction of carbon dioxide through Structure 2 and the membrane for proton transfer, respectively. The electron and the proton are reacted with carbon dioxide supplied to Structure 3 so as to produce a fuel material including hydrocarbon. However, the present disclosure may not be limited thereto. Especially, if the integrated reaction device for artificial photosynthesis according to the present disclosure is used, an electron produced by water photooxidation is transferred to Structure 3 for reduction reaction of carbon dioxide through Structure 2. During this process, it is unnecessary to apply an external voltage. Accordingly, energy efficiency of the artificial photosynthesis reaction can be improved.

In an illustrative embodiment, the integrated reaction device for artificial photosynthesis may be combined with a solar cell and/or a solar concentrator, but may not be limited thereto. In order to further facilitate the transfer of the electron produced by the oxidation reaction of water in Structure 1 to Structure 3, if necessary, the solar cell may be connected to Structure 2 to supply an overvoltage necessary for the electron transfer or may be connected between Structure 1 and Structure 3 to supply an overvoltage necessary for the electron transfer, but may not be limited thereto. The solar concentrator, if necessary, may be used to supply heat for improving a temperature of reaction occurring in the integrated reaction device for artificial photosynthesis, but may not be limited thereto.

A third aspect of the present disclosure can provide a composite structure for artificial photosynthesis reaction, including:

a membrane for proton transfer;

Structure 1' for oxidation reaction of water under light-irradiation;

Structure 2' for electron transfer; and

Structure 3' for reduction reaction of carbon dioxide, wherein Structure 2' is formed within the membrane for proton transfer such that both ends of Structure 2' are exposed to the outside of the membrane for proton transfer, Structures 1' and 3' are formed on both sides of Structure 2', respectively, and an electron and a proton produced by the oxidation reaction of water under light-irradiation in Structure 1' are transferred to Structure 3' through Structure 2' and the membrane for proton transfer to be reacted with carbon dioxide supplied to Structure 3' and produce a fuel material including hydrocarbon.

Figure 3:
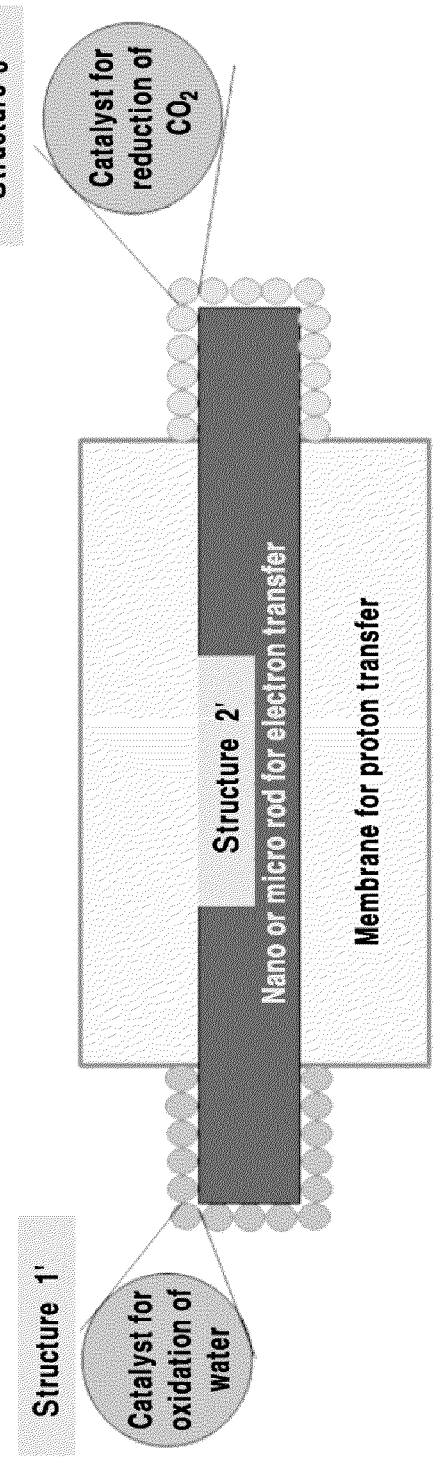
FIG. 3 is a schematic diagram of a composite structure for artificial photosynthesis reaction in accordance with an illustrative embodiment of the present disclosure.

In the composite structure for artificial photosynthesis reaction (refer to FIG. 3), it is unnecessary to apply an external voltage during the process, in which an electron and a proton formed by the oxidation reaction of water in Structure 1' are transferred to Structure 3' through Structure 2' and the membrane for proton transfer to be reacted with carbon dioxide supplied to Structure 3' and produce a fuel material including hydrocarbon. Accordingly, if the composite structure for artificial photosynthesis reaction is applied to artificial photosynthesis reaction, energy conversion efficiency can be improved.

In an illustrative embodiment, Structure 1' may be formed including a photoactive material, but may not be limited thereto. For example, the photoactive material may have activity with respect to visible light, ultraviolet light and/or infrared light, but may not be limited thereto.

In an illustrative embodiment, Structure 3' may be formed including a photoactive material, but may not be limited thereto. For example, the photoactive material may have activity with respect to visible light, ultraviolet light and/or infrared light, but may not be limited thereto.

In an illustrative embodiment, Structure 2' may be in the form of a rod having from a nanometer size to a micrometer size, but may not be limited thereto.

Figure 4:
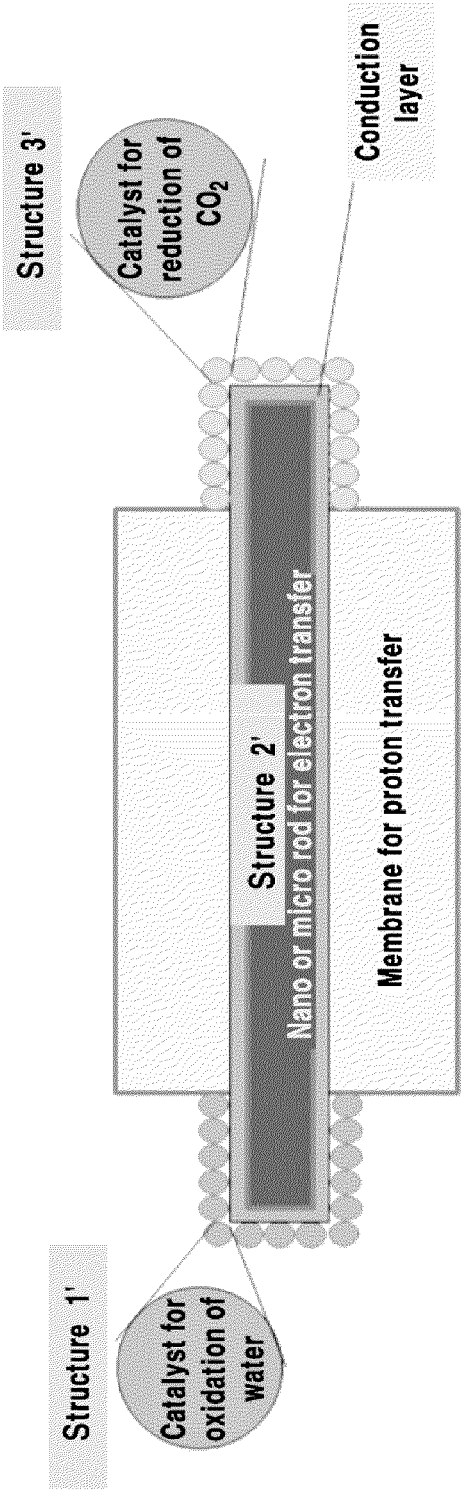
FIG. 4 is a schematic diagram of the composite structure for artificial photosynthesis reaction of FIG. 3, further including a conduction layer in accordance with an illustrative embodiment of the present disclosure.

In an illustrative embodiment, the composite structure for artificial photosynthesis reaction may further include a conduction layer formed on Structure 2' (refer to FIG. 4), but may not be limited thereto. In an illustrative embodiment, the conduction layer may include a conductive inorganic material, a conductive organic material or a combination thereof, but may not be limited thereto. For example, the conductive inorganic material may include a transition metal or a conductive carbon material, but may not be limited thereto. The transition metal may include platinum, gold, palladium, nickel, silver, titanium or combinations thereof, but may not be limited thereto. The conductive carbon material may include graphene, CNT, graphite or combinations thereof, but may not be limited thereto.

In an illustrative embodiment, the composite structure for artificial photosynthesis reaction may further include an insulating layer formed on Structure 2', but may not be limited thereto.

Figure 5:
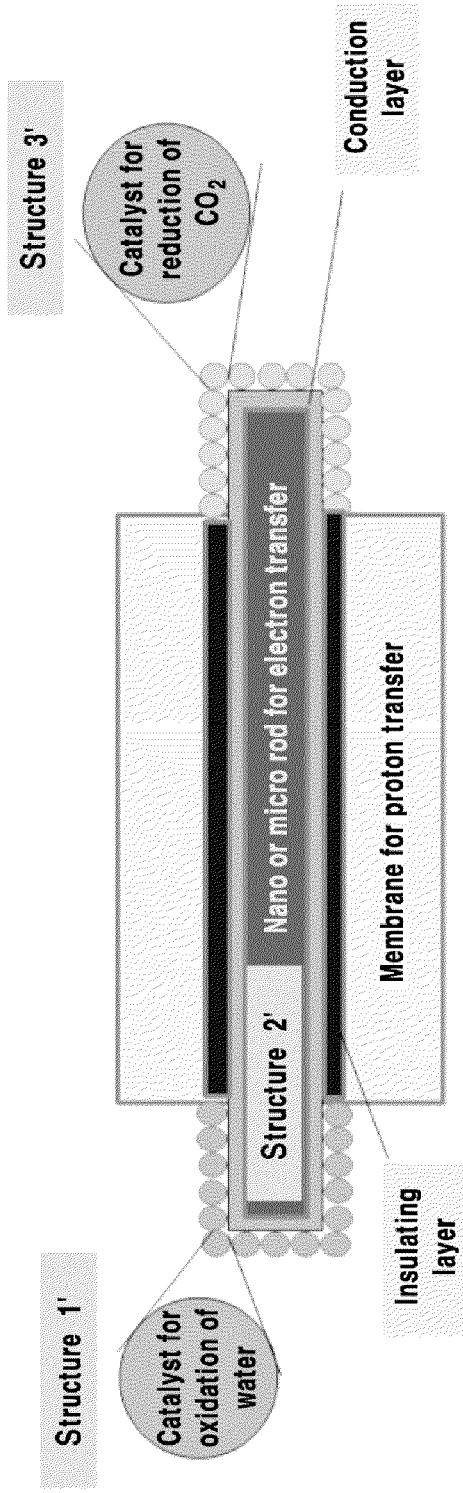
FIG. 5 is a schematic diagram of the composite structure for artificial photosynthesis reaction of FIG. 3, further including a conduction layer and an insulating layer in accordance with an illustrative embodiment of the present disclosure.

In an illustrative embodiment, the composite structure for artificial photosynthesis reaction may further include a conduction layer formed on Structure 2' and an insulating layer formed on the conduction layer (refer to FIG. 5), but may not be limited thereto.

For example, the insulating layer may include an insulating inorganic material, an insulating organic material or a combination thereof, but may not be limited thereto. As the insulating inorganic material and the insulating organic material, materials known in the art of the present disclosure may be used without limitation. For example, the insulating inorganic material may include an insulating metal oxide, an insulating inorganic polymer or a combination thereof, but may not be limited thereto. For example, the insulating organic material may include an insulating organic polymer, but may not be limited thereto. Unlimited examples for the insulating organic polymer may include a polyethylene-based polymer, a polyprophylene-based polymer, a polyacrylate-based polymer (e.g.: PMMA, etc.) or a polystyrene-based polymer, but may not be limited thereto.

In an illustrative embodiment, each of Structures 1' and 3' may be in the form of a nanoparticle, but may not be limited thereto.

In an illustrative embodiment, as the membrane for proton transfer, a material known in the art of the present disclosure and having an ability to transfer a proton may be used without limitation. In an illustrative embodiment, the membrane for proton transfer may include a polymer for proton transfer, a glass or non-crystalline material for proton transfer, or a crystalline material for proton transfer, but may not be limited thereto. In another illustrative embodiment, the membrane for proton transfer may include an organic polymer, an inorganic polymer, or an organic-inorganic hybrid polymer, which has an ability to transfer a proton, but may not be limited thereto. For example, the membrane for proton transfer may include an organic polymer, an inorganic polymer or an organic-inorganic hybrid polymer, which has a hydrogen ion-exchangeable group, but may not be limited thereto.

In an illustrative embodiment, the membrane for proton transfer may include a fluorine-containing polymer for proton transfer or a composite of the fluorine-containing polymer/LDH for proton transfer, but may not be limited thereto. For example, the membrane for proton transfer may include a nafion, a nafion/LDH composite, or a phosphosilicate, but may not be limited thereto.

In an illustrative embodiment, Structure 2' may be formed including a conductor, a nonconductor, a semiconductor or combinations thereof, but may not be limited thereto.

In an illustrative embodiment, Structure 2' may include a conductive organic material, a conductive inorganic material, an organic semiconductor, an inorganic semiconductor, or combinations thereof, for electron transfer, but may not be limited thereto. For example, Structure 2' may include a member selected from the group consisting of a metal, a semiconductor or a combination thereof; a conductive organic material, an organic semiconductor or a combination thereof; and combinations thereof, but may not be limited thereto.

A fourth aspect of the present disclosure can provide an integrated reaction device for artificial photosynthesis, including the composite structure for artificial photosynthesis reaction according to the third aspect of the present disclosure. In the integrated reaction device for artificial photosynthesis, a multiple number of the composite structures for artificial photosynthesis reaction may be arranged in the form of an array.

In an illustrative embodiment, the integrated reaction device for artificial photosynthesis may include:

a reaction chamber, which includes at least one light transmitting transparent part, and in which at least one photooxidation reaction part of water and at least one reduction reaction part of carbon dioxide are placed in order and in an alternative manner;

at least one array of the composite structure for artificial photosynthesis reaction being placed between the photooxidation reaction part of water and the reduction reaction part of carbon dioxide, which are arranged in an alternative manner;

a supply part of water formed in one side of each of the at least one photooxidation reaction part of water, and a discharge part of oxygen formed in the other side thereof;

a supply part of carbon dioxide formed in one side of each of the at least one reduction reaction part of carbon dioxide, and a discharge part of product formed in the other side thereof, and wherein Structure 1' and Structure 3' included in the array are placed to contact with the photooxidation reaction part of water and the reduction reaction part of carbon dioxide, respectively.

In an illustrative embodiment, in the integrated reaction device for artificial photosynthesis, an electron and a proton produced by the oxidation reaction of water in Structure 1' through light-irradiation to the photooxidation reaction part of water are transferred to Structure 3's for reduction reaction of carbon dioxide through Structure 2' and the membrane for proton transfer, respectively, to be reacted with carbon dioxide supplied to Structure 3' and produce a fuel material including hydrocarbon. However, the present disclosure may not be limited thereto. Especially, if the integrated reaction device for artificial photosynthesis according to the present disclosure is used, it is unnecessary to apply an external voltage during the process, in which an electron produced by the photooxidation reaction of water in Structure 1' is transferred to Structure 3' for reduction reaction of carbon dioxide through Structure 2'. Accordingly, energy efficiency of the artificial photosynthesis reaction can be improved.

In an illustrative embodiment, the integrated reaction device for artificial photosynthesis may be combined with a solar cell and/or a solar concentrator, but may not be limited thereto. In order to further facilitate electron transfer generated by the oxidation reaction of water in Structure 1' to Structure 3', if necessary, the solar cell may be connected to Structure 2' to supply an overvoltage necessary for the electron transfer or may be connected between Structure 1' and Structure 3' to supply an overvoltage necessary for the electron transfer. However, the present disclosure may not be limited thereto. The solar concentrator, if necessary, may be used to supply heat for improving a temperature of a reaction occurring in the integrated reaction device for artificial photosynthesis, but may not be limited thereto.

A fifth aspect of the present disclosure can provide a composite structure for water splitting reaction, including:

a membrane for proton transfer;

Structure 1" for oxidation reaction of water under light-irradiation;

Structure 2" for electron transfer; and

Structure 3" for reduction reaction of proton, wherein Structure 2" is formed within the membrane for proton transfer such that both ends of Structure 2" are exposed to the outside of the membrane for proton transfer, Structures 1" and 3" are formed in both sides of Structure 2", respectively, and an electron and a proton produced by the oxidation reaction of water under light-irradiation in Structure 1" are transferred to Structure 3" through Structure 2" and the membrane for proton transfer to be reduced in Structure 3" and produce hydrogen.

In an illustrative embodiment, Structure 1" may be formed including a photoactive material, but may not be limited thereto. For example, the photoactive material may have activity with respect to visible light, ultraviolet light and/or infrared light, but may not be limited thereto.

In an illustrative embodiment, Structure 3" may be formed including a photoactive material, but may not be limited thereto. For example, the photoactive material may have activity with respect to visible light, ultraviolet light and/or infrared light, but may not be limited thereto.

Figure 6:
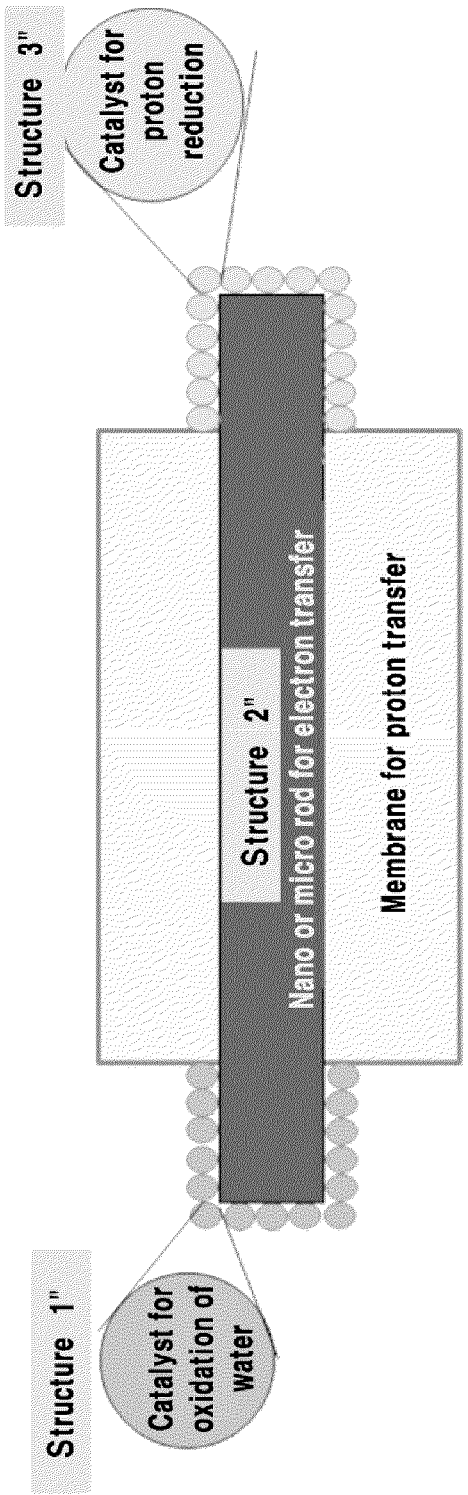
FIG. 6 is a schematic diagram of a composite structure for water splitting reaction in accordance with an illustrative embodiment of the present disclosure.

In an illustrative embodiment, Structure 2" may be in the form of a rod having from a nanometer size to a micrometer size (refer to FIG. 6), but may not be limited thereto.

Figure 7:
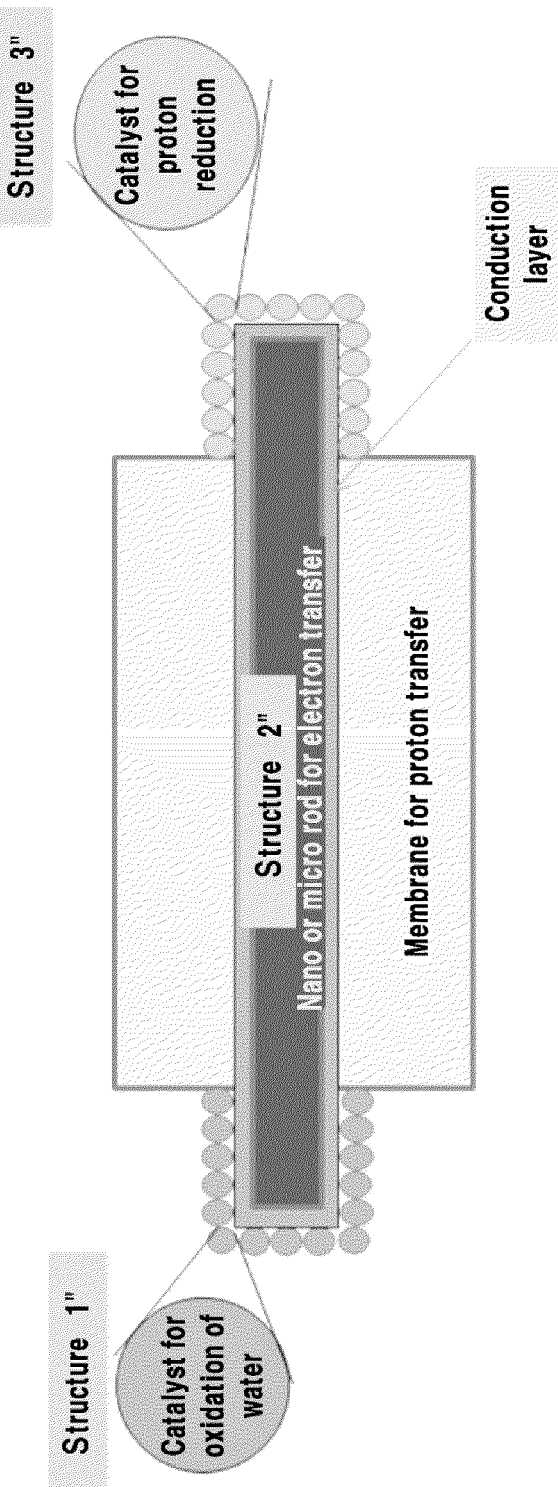
FIG. 7 is a schematic diagram of the composite structure for water splitting reaction of FIG. 6, further including a conduction layer in accordance with an illustrative embodiment of the present disclosure.

In an illustrative embodiment, the composite structure for water splitting reaction may further include a conduction layer formed on Structure 2" (refer to FIG. 7), but may not be limited thereto. In an illustrative embodiment, the conduction layer may include a conductive inorganic material, a conductive organic material or a combination thereof, but may not be limited thereto. For example, the conductive inorganic material may include a transition metal or a conductive carbon material, but may not be limited thereto. The transition metal may include platinum, gold, palladium, nickel, silver, titanium or combinations thereof, but may not be limited thereto. The conductive carbon material may include graphene, CNT, graphite or combinations thereof, but may not be limited thereto.

In an illustrative embodiment, the composite structure for water splitting reaction may further include an insulating layer formed on Structure 2", but may not be limited thereto.

Figure 8:
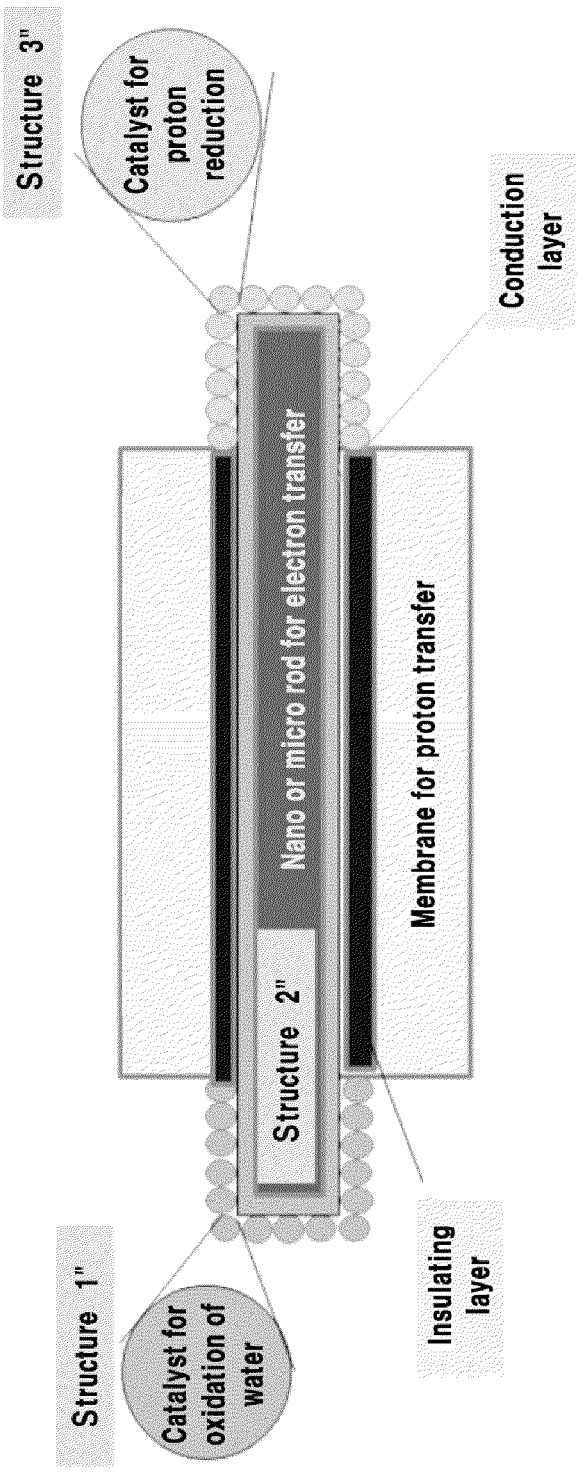
FIG. 8 is a schematic diagram of the composite structure for water splitting reaction of FIG. 6, further including a conduction layer and an insulating layer in accordance with an illustrative embodiment of the present disclosure.

In an illustrative embodiment, the composite structure for water splitting reaction may include a conduction layer formed on Structure 2" and an insulating layer formed on the conduction layer (refer to FIG. 8), but may not be limited thereto.

For example, the insulating layer may include an insulating inorganic material, an insulating organic material or a combination thereof, but may not be limited thereto. As the insulating inorganic material and the insulating organic material, materials known in the art of the present disclosure may be used without limitation. For example, the insulating inorganic material may include an insulating metal oxide, an insulating inorganic polymer or a combination thereof, but may not be limited thereto. For example, the insulating organic material may include an insulating organic polymer, but may not be limited thereto. Unlimited examples for the insulating organic polymer may include a polyethylene-based polymer, a polyprophylene-based polymer, a polyacrylate-based polymer (e.g.: PMMA, etc.) or a polystyrene-based polymer, but may not be limited thereto.

In an illustrative embodiment, each of Structures 1' and 3' may be in the form of a nanoparticle, but may not be limited thereto.

In an illustrative embodiment, as the membrane for proton transfer, a material known in the art of the present disclosure and having an ability to transfer a proton may be used without limitation. In an illustrative embodiment, the membrane for proton transfer may include a polymer for proton transfer, a glass or non-crystalline material for proton transfer, or a crystalline material for proton transfer, but may not be limited thereto. In another illustrative embodiment, the membrane for proton transfer may include an organic polymer, an inorganic polymer, or an organic-inorganic hybrid polymer, which has an ability to transfer a proton, but may not be limited thereto. For example, the membrane for proton transfer may include an organic polymer, an inorganic polymer or an organic-inorganic hybrid polymer, which has a hydrogen ion-exchangeable group, but may not be limited thereto.

In an illustrative embodiment, the membrane for proton transfer may include a fluorine-containing polymer for proton transfer, or a composite of the fluorine-containing polymer/LDH for proton transfer or phosphosilicate, but may not be limited thereto. For example, the membrane for proton transfer may include a nafion, a nafion/LDH composite or a phosphosilicate, but may not be limited thereto.

In an illustrative embodiment, Structure 2" may be formed including a conductor, a nonconductor, a semiconductor or combinations thereof, but may not be limited thereto.

In an illustrative embodiment, Structure 2" may include a conductive organic material, a conductive inorganic material, an organic semiconductor, an inorganic semiconductor or combinations thereof, for electron transfer, but may not be limited thereto. For example, Structure 2" may include a member selected from the group consisting a metal, a semiconductor or a combination thereof; a conductive organic material, an organic semiconductor or a combination thereof; and combinations thereof, i.e., a conductive material including platinum, gold, palladium, nickel, silver, titanium, copper, graphene, CNT, graphite or combinations thereof; a semiconductor including n-type silicone, p-type silicone, a compound semiconductor, an oxide semiconductor or combinations thereof; a conductive polymer including a conductive organic polymer, a conductive inorganic polymer or a combination thereof; or combinations thereof, but may not be limited thereto.

A sixth aspect of the present disclosure can provide an integrated reaction device for water splitting reaction, including the composite structure for water splitting reaction according to the fifth aspect of the present disclosure. In the integrated reaction device for water splitting reaction, a multiple number of the composite structures for water splitting reaction may be arranged in the form of an array.

In an illustrative embodiment, the integrated reaction device for water splitting reaction may include:

a reaction chamber, which includes at least one light transmitting transparent part and at least one photooxidation reaction part of water, and in which an array of the composite structure for water splitting reaction is placed between the photooxidation reaction parts of water; and a supply part of water formed in one side of the photooxidation reaction part of water, and a discharge part of hydrogen formed in the other side thereof; and wherein an electron and a proton produced by the oxidation reaction of water in Structure 1" through light-irradiation to one side of the photooxidation reaction part of water are transferred to Structure 3" through Structure 2" and the membrane for proton transfer, respectively, so as to be reduced and produce hydrogen.

In an illustrative embodiment, in the integrated reaction device for water splitting reaction, an electron and a proton produced by the oxidation reaction of water in Structure 1" through light-irradiation to the photooxidation reaction part of water are transferred to Structure 3" for reduction reaction of carbon dioxide through Structure 2" and the membrane for proton transfer to be reacted with carbon dioxide supplied to Structure 3" and produce a fuel material including hydrocarbon. However, the present disclosure may not be limited thereto. Especially, if the composite structure for water splitting reaction according to the present disclosure is used, it is unnecessary to apply an external voltage during the process, in which an electron produced by the photooxidation reaction of water in Structure 1" is transferred to Structure 3" through Structure 2". Accordingly, energy efficiency of the artificial photosynthesis reaction can be improved.

In an illustrative embodiment, the integrated reaction device for water splitting reaction may be combined with a solar cell and/or a solar concentrator, but may not be limited thereto. In order to further facilitate electron transfer produced by the oxidation reaction of water in Structure 1" to Structure 3", if necessary, the solar cell may be connected to Structure 2" to supply overvoltage necessary for the electron transfer or may be connected between Structure 1" and Structure 3" to supply overvoltage necessary for the electron transfer. However, the present disclosure may not be limited thereto. The solar concentrator, if necessary, may be used to supply heat for improving a temperature of reaction occurring in the integrated reaction device for artificial photosynthesis, but may not be limited thereto.

Hereinafter, the present disclosure will be described more in detail with reference to examples, but may not be limited thereto.

EXAMPLE 1

Figure 9:
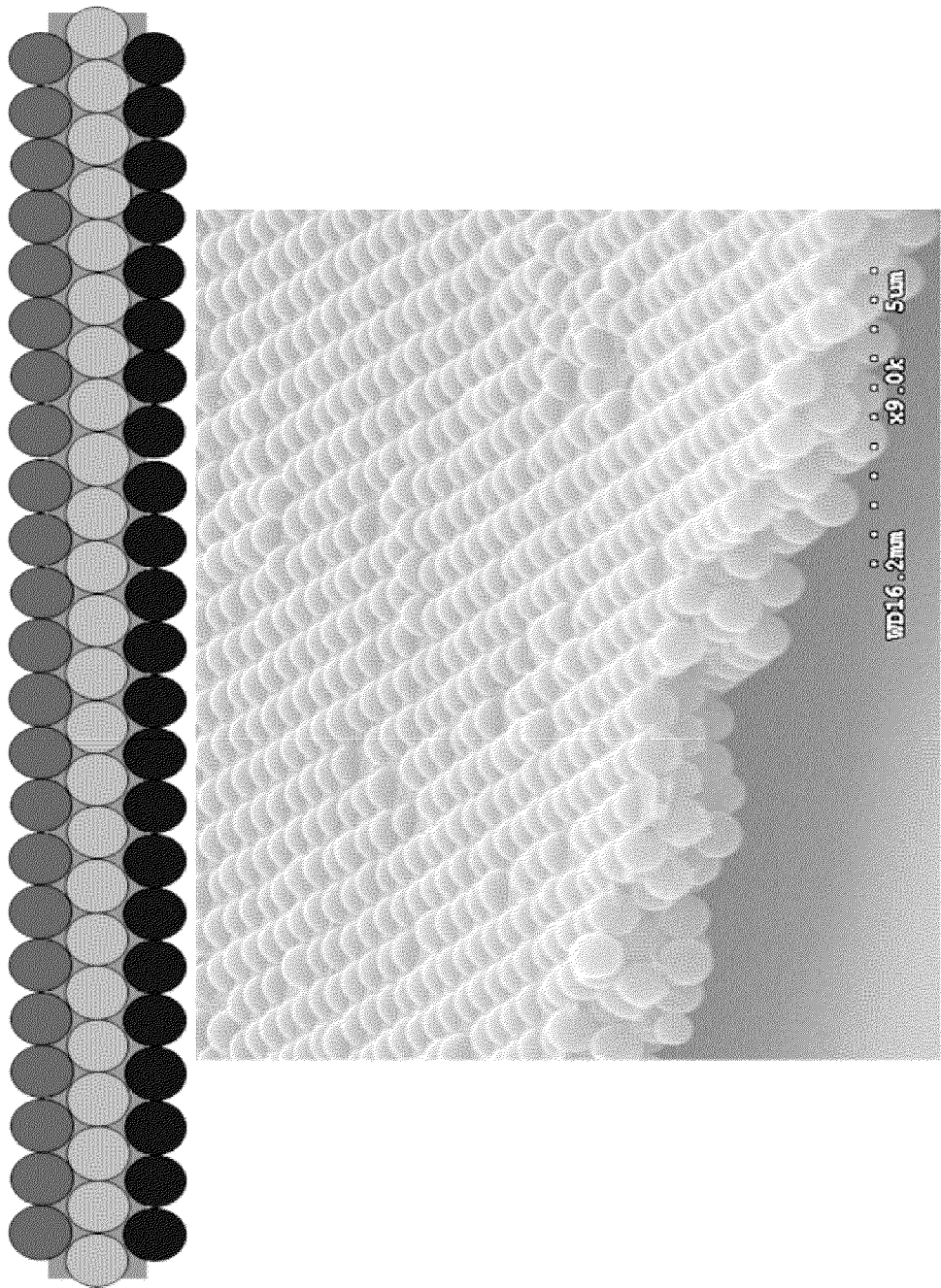
FIG. 9 provides (a) a schematic diagram and (b) an SEM image of a composite structure for artificial photosynthesis reaction in accordance with an example of the present disclosure.

FIG. 9 provides (a) a schematic diagram and (b) a SEM photograph of a composite structure for artificial photosynthesis reaction in accordance with an example of the present disclosure. The composite structure for artificial photosynthesis reaction in accordance with an example of the present disclosure was prepared by regularly arranging three types of particles through rubbing. The three types of particles correspond to Structure 1 for oxidation reaction of water under light-irradiation, Structure 2 joined with Structure 1 to transfer an electron produced by the oxidation reaction of water in Structure 1, and Structure 3 for reduction reaction of carbon dioxide being joined with Structure 2, respectively.

Figure 10:
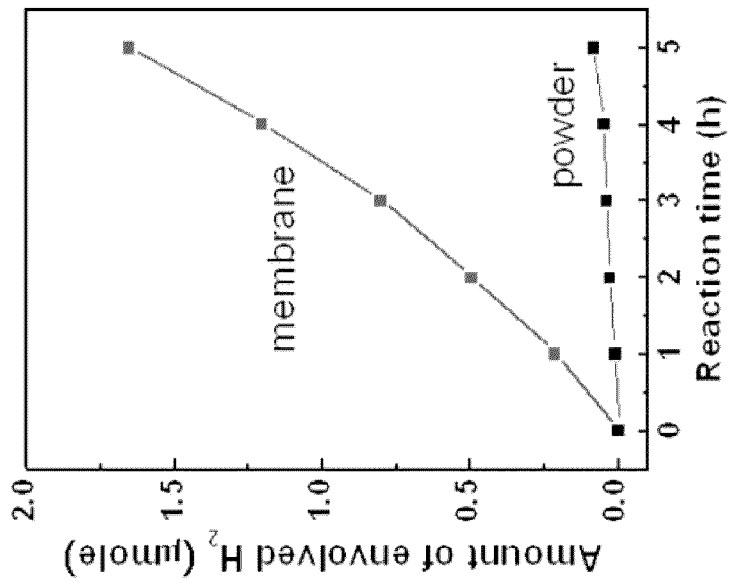
FIG. 10 provides (a) a schematic diagram and (b) an SEM image of a composite structure for water splitting reaction in accordance with an example of the present disclosure, and (c) a graph showing results of production of hydrogen through photooxidation of water using the composite structure for water splitting reaction.
Figure 10:
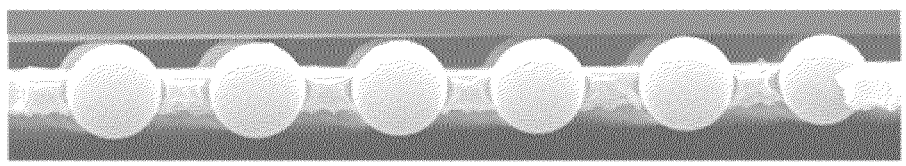
Figure 10:
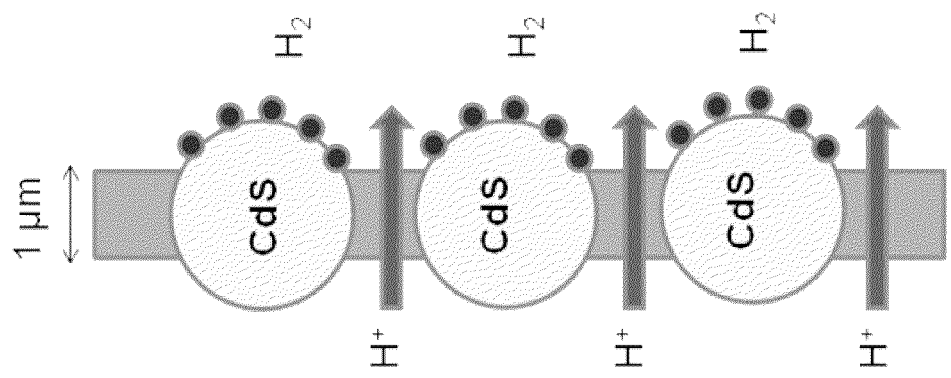

FIG. 10 provides a scanning electron microscope (SEM) photograph of a composite structure for water splitting reaction in accordance with an example of the present disclosure and results of hydrogen production experiments.

Specifically, for the composite structure for water splitting reaction in accordance with an example of the present disclosure, the porous thin film having holes consisting of poly methylmethacrylate acrylate (PMMA) was formed, and a CdS photocatalyst layer was deposited on the porous thin film through a sputtering process so as to form a CdS photocatalyst layer. It was identified that the holes of the photocatalyst layer were very regularly arranged. With reference to FIG. 9, it was further identified through an X-ray photoelectron spectroscopy (XPS) that the CdS photocatlayst layer was formed on the thin film having holes consisting of PMMA.

FIG. 10 provides a cross-sectional view of the composite structure for water splitting reaction, which was formed by injecting nafion as a hydrogen ion transport material into the inside of the holes of the CdS photocatalyst layer in accordance with an example of the present disclosure, and of which the cross-section was observed by using a scanning electron microscope, and a hydrogen production amount.

More specifically, FIG. 10 provides results of comparison of a hydrogen production amount between the composite structure for water splitting reaction in accordance with an example of the present disclosure and a photocatalyst in the form of powder prepared as a comparative example. All the reaction conditions were the same. More specifically, form acid (0.1 mL) was used as a hydrogen ion source. Visible light (solar light) 100 mW/cm$^2$ was irradiated to each of the membranes for approximately 1 to 5 hours. As a result, an amount of $H_2$ produced was observed and compared. As shown in FIG. 10, in case of the composite structure for water splitting reaction including a photocatlayst layer in a porous structure in accordance with an example of the present disclosure, the production amount of hydrogen was greater than that of the CdS (0.1 mg) photocatalyst in the form of powder. As the reaction time lapses, it was observed that the difference in the production amount became larger. For example, after 5 hours for reaction lapsed, it was observed that the production amount of hydrogen in case of using the photocatalyst layer in accordance with an example of the present disclosure and the production amount of hydrogen in case of using the powder photocatalyst layer were approximately 1.6 μmol/h and approximately 0.15 μmol/h, respectively, which correspond to approximately ten (10) times or more difference.

The present disclosure has been described in detail with reference to illustrative embodiments and examples. However, the present disclosure is not limited to the illustrative embodiments and the examples and can be modified in various forms. It is apparent that the present disclosure can be modified by one of ordinary skill in the art in various forms within the technical idea of the present disclosure.

What is claimed is:

1. A composite structure for artificial photosynthesis reaction, comprising:
   Structure 1 for an oxidation reaction of water under light-irradiation;
   Structure 2 joined with Structure 1 to transfer an electron produced by the oxidation reaction of water in Structure 1;
   Structure 3 for a reduction reaction of carbon dioxide being joined with Structure 2; and
   a membrane for proton transfer,
   wherein Structures 1 to 3 are placed in the inside of the membrane for proton transfer, and at least part of Structure 1 and at least part of Structure 3 are exposed to the outside of the membrane for proton transfer, and
   each of an electron and a proton formed by the oxidation reaction of water in Structure 1 are transferred to Structure 3 through Structure 2 and the membrane for proton transfer to be reacted with carbon dioxide supplied to Structure 3 and produce a fuel material including hydrocarbon.

2. The composite structure for artificial photosynthesis reaction of claim 1,
   wherein Structure 1 includes a first support particle and a photocatalyst particle for an oxidation reaction of water being formed on a surface of the first support particle, and
   Structure 3 includes a second support particle and a catalyst particle for a reduction reaction of carbon dioxide being formed on a surface of the second support particle.

3. The composite structure for artificial photosynthesis reaction of claim 1,
   wherein the membrane for proton transfer is prepared by using a porous thin film having a hole, and Structures 1, 2 and 3 in the form of particle is joined in order with the hole of the porous thin film and placed therein.

4. The composite structure for artificial photosynthesis reaction of claim 1,
   wherein Structure 2 includes a conductive organic material, a conductive inorganic material, an organic semiconductor, an inorganic semiconductor, or combinations thereof, for electron transfer.

5. An integrated reaction device for artificial photosynthesis, comprising the composite structure for artificial photosynthesis reaction according to claim 1.

6. The integrated reaction device for artificial photosynthesis of claim 5, including:
   a reaction chamber, which includes at least one light transmitting transparent part, and in which at least one photooxidation reaction part of water and at least one reduction reaction part of carbon dioxide are placed either in order or in an alternative manner;
   at least one array of the composite structure for artificial photosynthesis reaction being placed between the photooxidation reaction part of water and the reduction reaction part of carbon dioxide, which are placed in an alternative manner;

a supply part of water formed in one side of each of the at least one photooxidation reaction part of water and a discharge part of oxygen formed in the other side thereof;

a supply part of carbon dioxide formed in one side of each of the at least one reduction reaction part of carbon dioxide, and a discharge part of product formed in the other side thereof; and wherein Structure 1 and Structure 3 included in the array are placed to contact with the photooxidation reaction part of water and the reduction reaction part of carbon dioxide, respectively.

7. The integrated reaction device for artificial photosynthesis of claim 6, wherein the electron and the proton produced by the oxidation reaction of water in Structure 1 through light-irradiation to the photooxidation reaction part of water are transferred to Structure 3 for reduction reaction of carbon dioxide through Structure 2 and the membrane for proton transfer, respectively, and the electron and the proton are reacted with carbon dioxide supplied to Structure 3 to produce a fuel material including hydrocarbon.

8. A composite structure for artificial photosynthesis reaction, comprising:

a membrane for proton transfer;

Structure 1' for oxidation reaction of water under light-irradiation;

Structure 2' for electron transfer; and

Structure 3' for a reduction reaction of carbon dioxide, wherein Structure 2' is formed within the membrane for proton transfer such that both ends of Structure 2' are exposed to the outside of the membrane for proton transfer, Structures 1' and 3' are formed on both sides of Structure 2', respectively, and an electron and a proton produced by the oxidation reaction of water under light-irradiation in Structure 1' are transferred to Structure 3' through Structure 2' and the membrane for proton transfer to be reacted with carbon dioxide supplied to Structure 3' and produce a fuel material including hydrocarbon.

9. The composite structure for artificial photosynthesis reaction of claim 8, further including a conduction layer formed on Structure 2'.

10. The composite structure for artificial photosynthesis reaction of claim 8, further including an insulating layer formed on Structure 2'.

11. The composite structure for artificial photosynthesis reaction of claim 8, wherein Structure 2' is formed including a conductive organic material, a conductive inorganic material, an organic semiconductor, an inorganic semiconductor, or combinations thereof, for electron transfer.

12. An integrated reaction device for artificial photosynthesis, comprising the composite structure according to claim 8.

13. The integrated reaction device for artificial photosynthesis of claim 12, including:

a reaction chamber, which includes at least one light transmitting transparent part, and in which at least one photooxidation reaction part of water and at least one reduction reaction part of carbon dioxide are placed either in order or in an alternative manner;

at least one array of the composite structure for artificial photosynthesis reaction being placed between the photooxidation reaction part of water and the reduction reaction part of carbon dioxide, which are arranged in an alternative manner;

a supply part of water formed in one side of each of the at least one photooxidation reaction part of water and a discharge part of oxygen formed in the other side thereof; and a supply part of carbon dioxide formed in one side of each of the at least one reduction reaction part of carbon dioxide, and a discharge part of product formed in the other side thereof, and wherein Structure 1' and Structure 3' included in the array are placed to contact with the photooxidation reaction part of water and the reduction reaction part of carbon dioxide, respectively.

14. The integrated reaction device for artificial photosynthesis of claim 13, wherein the electron and the proton produced by the oxidation reaction of water in Structure 1' through light-irradiation to the photooxidation reaction part of water are transferred to Structure 3' for reduction reaction of carbon dioxide through Structure 2' and the membrane for proton transfer, respectively, and the electron and the proton are reacted with carbon dioxide supplied to Structure 3' to produce a fuel material including hydrocarbon.

15. A composite structure for water splitting reaction, comprising:

a membrane for proton transfer;

Structure 1" for oxidation reaction of water under light-irradiation;

Structure 2" for electron transfer; and

Structure 3" for reduction reaction of proton, wherein Structure 2" is formed within the membrane for proton transfer such that both ends of Structure 2" are exposed to the outside of the membrane for proton transfer, Structures 1" and 3" are formed in both sides of Structure 2", respectively, and an electron and a proton produced by the oxidation reaction of water under light-irradiation in Structure 1" are transferred to Structure 3" through Structure 2" and the membrane for proton transfer to be reduced in Structure 3" and produce hydrogen.

16. The composite structure for water splitting reaction of claim 15, further including a conduction layer formed on Structure 2".

17. The composite structure for water splitting reaction of claim 15, further including an insulating layer formed on Structure 2".

18. The composite structure for water splitting reaction of claim 15, wherein Structure 2" is formed including a conductive organic material, a conductive inorganic material, an organic semiconductor, an inorganic semiconductor, or combinations thereof, for electron transfer.

19. An integrated reaction device for water splitting reaction, comprising the composite structure according to claim 15.

20. An integrated reaction device for water splitting reaction of claim 19, including:

a reaction chamber, which includes at least one light transmitting transparent part and at least one photooxidation reaction part of water, and in which an array of the composite structure for water splitting reaction is placed between the photooxidation reaction parts of water; and a supply part of water formed in one side of each of the photooxidation reaction part of water and a discharge part of hydrogen formed in the other side thereof; and wherein an electron and a proton produced by the oxidation reaction of water in Structure 1" through light-irradiation to one side of the photooxidation reaction part of water are transferred to Structure 3" through Structure 2" and the membrane for proton transfer, respectively, to be reduced and produce hydrogen.

* * * * *